United States Patent
Lounasaho et al.

(10) Patent No.: US 7,318,537 B2
(45) Date of Patent: Jan. 15, 2008

(54) METHOD AND APPARATUS FOR CONTROLLING THE SPEED AND/OR DIRECTION OF MOVEMENT OF A SCREW DISCHARGER

(75) Inventors: Petri Lounasaho, Pori (FI); Reino Malmi, Rauma (FI)

(73) Assignee: Raumaster Oy, Rauma (FI)

( * ) Notice: Subject to any disclaimer, the term of this patent is extended or adjusted under 35 U.S.C. 154(b) by 524 days.

(21) Appl. No.: 10/501,868

(22) PCT Filed: Feb. 7, 2003

(86) PCT No.: PCT/FI03/00096

§ 371 (c)(1),
(2), (4) Date: Jul. 20, 2004

(87) PCT Pub. No.: WO03/066480

PCT Pub. Date: Aug. 14, 2003

(65) Prior Publication Data

US 2005/0035145 A1    Feb. 17, 2005

(30) Foreign Application Priority Data

Feb. 7, 2002    (FI) ................................. 20020256

(51) Int. Cl.
*B67B 7/00*    (2006.01)

(52) U.S. Cl. .............. 222/1; 222/52; 222/55; 222/63; 222/410; 222/412; 700/240

(58) Field of Classification Search .............. 222/1, 222/52, 63, 410–414, 55; 700/240
See application file for complete search history.

(56) References Cited

U.S. PATENT DOCUMENTS

| 4,256,453 A | 3/1981 | Csapo |
| 4,462,744 A | 7/1984 | Rasilainen et al. |
| 4,983,090 A * | 1/1991 | Lehmann et al. ........... 414/326 |
| 5,662,272 A | 9/1997 | Buquet et al. |

FOREIGN PATENT DOCUMENTS

| FI | 107378 | 7/2001 |
| FI | 109115 | 5/2002 |
| FI | 109589 | 9/2002 |
| GB | 2 189 326 | 10/1987 |
| JP | 6057784 | 3/1994 |

* cited by examiner

*Primary Examiner*—Frederick C. Nicolas
(74) *Attorney, Agent, or Firm*—Nixon & Vanderhye P.C.

(57) ABSTRACT

This invention relates to a method and an apparatus for controlling the speed and/or direction of movement (A, B) of a screw discharger (1, 11, 101, 201). According to the invention, the bending load on the screw (2, 12, 102, 202) of the screw discharger is measured by means of one or more transducers (112, 212) which generate a loading signal on the basis of which the drive system (110, 210) controlling the speed and/or direction of movement (A, B) of the screw discharger (1, 11, 101, 201) is controlled.

10 Claims, 6 Drawing Sheets

Figure 1:
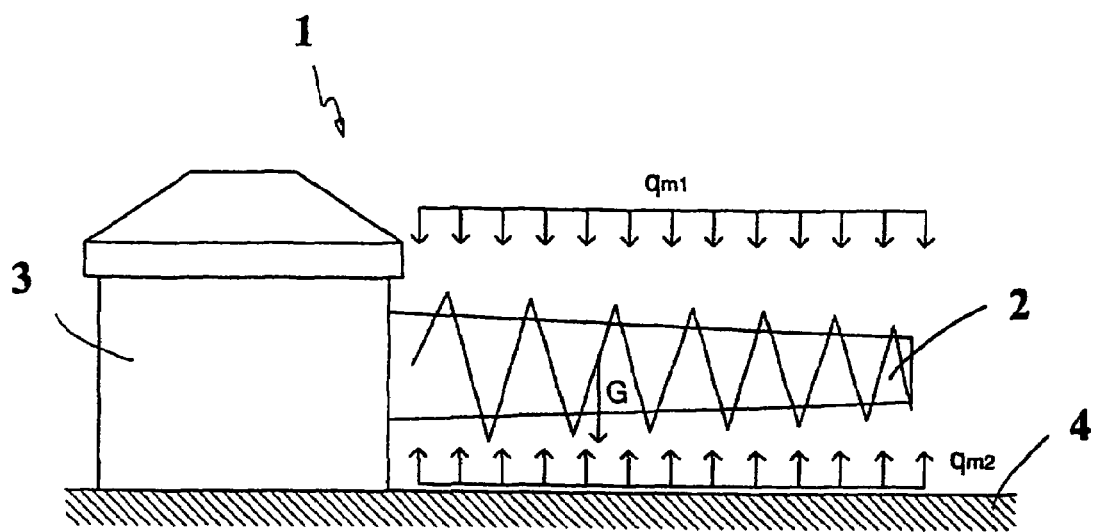

METHOD AND APPARATUS FOR CONTROLLING THE SPEED AND/OR DIRECTION OF MOVEMENT OF A SCREW DISCHARGER

This application is the US national phase of international application PCT/FI03/00096 filed 7 Feb. 2003 which designated the U.S. and claims benefit of FI 20020256, dated 7 Feb. 2002, the entire content of which is hereby incorporated by reference.

The invention relates to a method and an apparatus for controlling the speed and/or direction of movement of a screw discharger as defined in the preambles to the independent claims presented below. The invention relates in particular to the way of controlling the movement of the screw discharger as a function of the load exerted on the discharger.

Screw dischargers are used for discharging bulk material, for example wood chips, bark, sawdust, peat, coal or ash from storage, for example from a silo or an open pile. The operation of a screw discharger is based on a discharger screw that rotates about its longitudinal axis and moves in the pile of bulk material. The discharger screw typically consists of a screw pipe made of steel, to the external surface of which a spiral-formed thread made of steel strip or band has been attached. Screw dischargers are divided on the basis of their structure into slewing and travelling screw dischargers.

The slewing screw discharger comprises a discharger screw fixed so as to rotate generally in a horizontal plane with bearings in a frame rotating substantially about its vertical axis and a drive system for rotating the frame and the screw. The rotational movement of the screw discharger around its vertical axis is called the slewing motion and the speed of the slewing motion is called the slewing speed. The screw is supported by bearings either at both ends or only at its tail end in the so-called cantilever-type discharger. The structure of a slewing screw discharger is presented in greater detail, for example, in the Finnish patent publications FI 62033 and FI 107378.

The travelling screw discharger comprises a discharger screw attached by bearings to a mobile frame moving back and forth on tracks or other guideways and a drive system for moving the frame and rotating the screw. The movement of the travelling screw discharger on the guideways is called travelling motion and the speed of the same is called the travelling speed. In this structure, too, the screw may be supported by bearings either at both ends or only at its tail end in the cantilever-type discharger.

The structure of a travelling screw discharger is presented in greater detail for example, in the Finnish patent publication FI 990333.

The screw of a screw discharger moving about within a pile, among the bulk material, is subjected to horizontal bending loads, which are caused by the resistance due to the material contained in the pile and by the force creating the slewing or travelling motion of the screw, and to vertical bending loads, which are caused by the screw's own weight, the pressure of the pile and by the packing of material under the screw due to the rotational movement of the screw.

Figure 6:
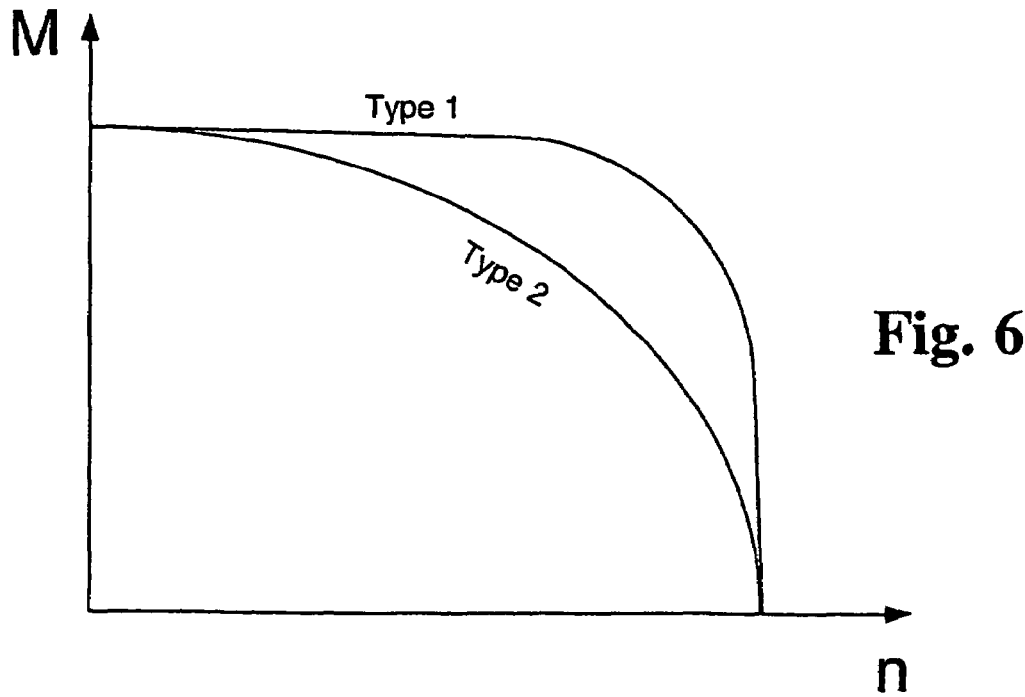

The speed of the slewing or travelling motion of a screw discharger has generally been either constant or the motor used in the system has been the so-called rotary magnet motor, the use of which causes the speed of the stewing or travelling motion to be determined by the resistance of the bulk material pile and the torque-speed of rotation curve of the rotary magnet motor. FIG. 6 shows schematically typical forms of the torque-speed of rotation curve of a rotary magnet motor according to the prior art. What is essential in these curves is that the slewing or travelling force of the screw has increased with the decreasing speed of the movement.

A significant problem relating to screw dischargers has been the breaking off of the screw due to a bending load of unforeseen magnitude being exerted on the screw in a particular situation. Bulk material stored in a storage pile or silo may, due to the pressure of the pile, in places in the lower part of the pile, be compacted into a very strong"wall" with which the screw collides while moving inside the pile. The collision gives rise to a heavy horizontal bending overload on the screw. On the other hand, while the screw rotates to its direction of movement, bulk material may be packed under the screw, thus causing a strong upward bending load on the screw.

Furthermore, elongated objects or impurities, such as stone or metal material, contained in homogeneous bulk material may cause momentary bending loads on the screw considerably exceeding the normal use situation.

Due to the momentary load peaks caused by the above-mentioned reasons, it has been necessary to over-dimension the screw pipe as compared with the normal use situation. This in turn has caused e.g. an unnecessary increase in the weight of structures, increased the need for slewing or travelling force and decreased functionality because increasing the diameter of the screw pipe also increases the motion resistance of the screw and therefore lessens the ability of the screw to penetrate into the pile.

In slewing screw dischargers, efforts have been made to prevent material from packing under the screw by arranging the discharger to turn in the direction opposite to the direction of the screw rotation. This solution, however, cannot be used in travelling dischargers, which have a back-and-forth travelling motion. The solution does not eliminate the problem of horizontal bending loads, either.

The Finnish patent application FI 20000351 represents a cantilever-type structure of the screw discharger where the screw, while subjected to momentary overloads, rests at its outer end on a rail acting as an overload support when the bending exceeds a preset value. The problem of this solution lies in the increase in slewing or travelling force and, through that, in the increased horizontal bending load exerted when the screw is in contact with the support rail.

Sometimes bridging, i.e. formation of large hollow spaces, occurs inside bulk material piles. When a screw discharger meets such a hollow space, the screw is not able to unload material from the pile until it reaches the edge of the hollow space. In order to keep the disruption in the flow of unloaded material as short as possible, it would be expedient to keep the slewing or travelling speed of the screw discharger as high as possible in the area of the hollow space.

The purpose of the invention presented here is to alleviate or even eliminate the above-mentioned problems arising in the prior art.

The purpose of the invention presented here is in particular to enable the use of a structurally lighter screw in the screw discharger.

In order to meet the above-mentioned objectives, among other things, a method and an apparatus for controlling the speed and/or direction of movement of a screw discharger according to the invention is characterised by what is presented in the preambles to the independent claims presented below.

In a typical solution according to the invention, the bending load exerted on the screw of a screw discharger is measured by means of one or more transducers. The drive system controlling the speed and/or direction of movement of the screw discharger is controlled on the basis of the bending load data obtained from the transducers. The speed of movement refers either to the slewing speed or to the travelling speed, depending on the type of discharger. The drive system controlling the speed and/or direction of movement refers to a typical screw discharger drive system, such as motors, gears and chains or other members used for the transmission of force.

A typical screw discharger according to the invention comprises a frame, a discharger screw attached to the frame and a drive system for moving the screw. A system for controlling the speed and/or direction of movement of the screw discharger has typically been attached to such a screw discharger according to the invention, the system comprising:

one or more measuring transducers arranged to measure the bending load on the screw, a control unit for processing the measurement data transmitted from the transducer and for converting the data into a control signal for the drive system controlling the speed and/or direction of movement of the screw discharger and data transmission means for transmitting measurement data from the transducer to the control unit and for transmitting control signals from the control unit to the drive system.

In a typical particularly advantageous solution, the speed of movement is lowered or the direction of movement is changed when the bending load on the screw exceeds a preset value, in which case the bending load on the screw decreases immediately. In a hollow space, on the other hand, the bending loads exerted on the screw are significantly lower than in a normal use situation, and in one preferred embodiment of the invention, the control unit can, when the loading values obtained from measurement transducers fall below a particular preset value, set the slewing or travelling speed of the discharger to a substantially higher value than in a normal use situation. When the screw meets the edge of the hollow space and the bending load on the screw exceeds the preset value, the control unit can again adjust the slewing or travelling speed of the discharger to a suitable value, for example to the initial value for a normal operating situation.

In a typical preferred embodiment of the invention, the control unit can operate so that when the bending load on the screw increases to a preset value $x_1$, the speed of movement of the screw is reduced, for example, by p %. If the bending load on the screw increases even after this and reaches a value $x_2$ ($x_2 > x_1$), the direction of movement of the screw is changed for a preset period of time. After this the direction of movement may be returned to the original setting. According to one preferred embodiment of the invention, if the bending load on the screw increases even after this and reaches a particular preset value, for example a value $x_1$, the control unit stops the screw discharger and transmits an error alarm, for example to a control room.

In one preferred embodiment of the invention, the slewing or travelling motion of the discharger is generated by a squirrel-cage induction motor, the speed and direction of rotation of which is adjusted by a frequency converter on the basis of a control signal from the control unit. A controllable slewing or travelling motion can also be created by means of a direct-current motor or a hydraulic motor.

The transducers measuring the bending load on the screw are preferably installed on the inside or outside surface of the screw pipe or in a suitable location on the frame of the discharger. Such suitable locations include areas where the voltage variations obtained from the transducers clearly correlate with the variations of bending load on the screw. The most advantageous such location on the frame of the discharger is essentially close to the points supported by bearings. The transducers are preferably of the strain-gauge sensor type, which are known as solutions for measuring tensions in steel structures.

If the transducers are installed in the screw pipe, the measurement signal is preferably transferred from the rotating screw to the control unit by using wires running inside the screw pipe and, for example, a power supply unit based on slip ring or wireless telemetry technology. Data transmission between the transducers, control unit and drive system can be effected, for example, by means of so-called Bluetooth technology.

The control unit and frequency converter can therefore be situated either on the mobile frame of the discharger or outside it, for example in the power room. The task of the control unit can also be performed by the plant automation system, to which the signal from measurement transducers is transmitted for processing and which generates the control signal, for example, for the frequency converter, which then controls the speed and/or direction of the slewing or travelling motion. The control unit may also be a separate unit independent of the centralised automation system of the plant, such as a programmable logic controller.

Figure 2:
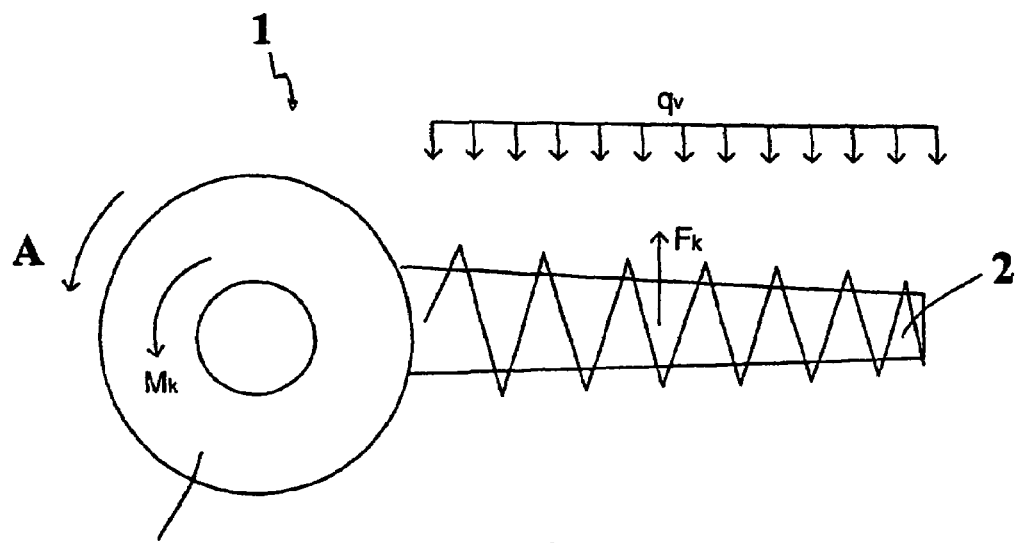
Figure 3:
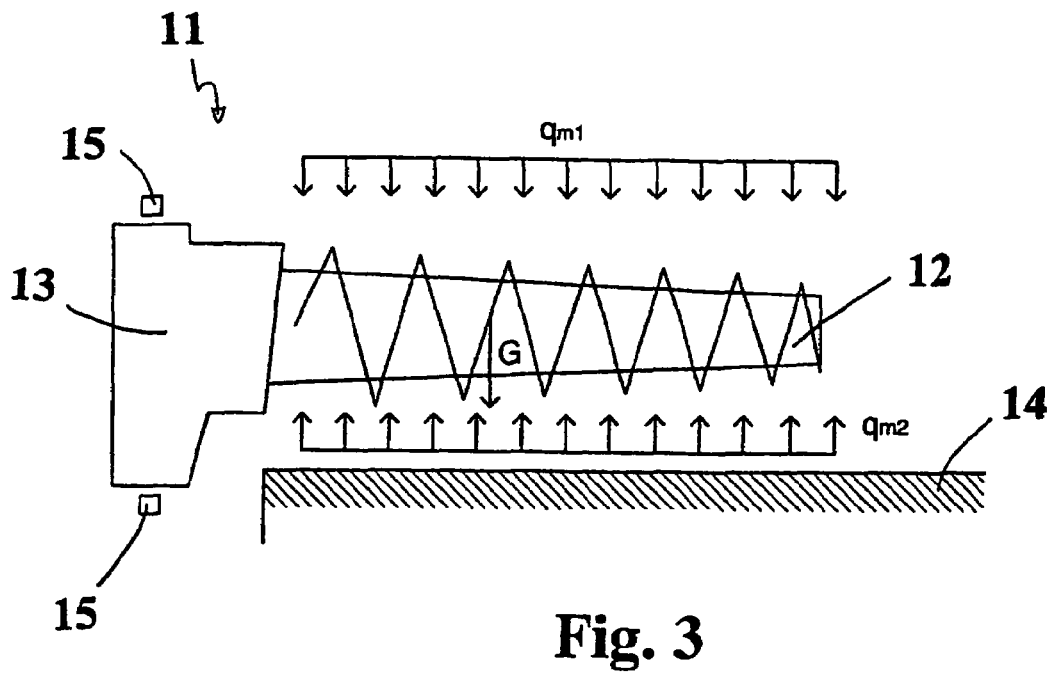
Figure 4:
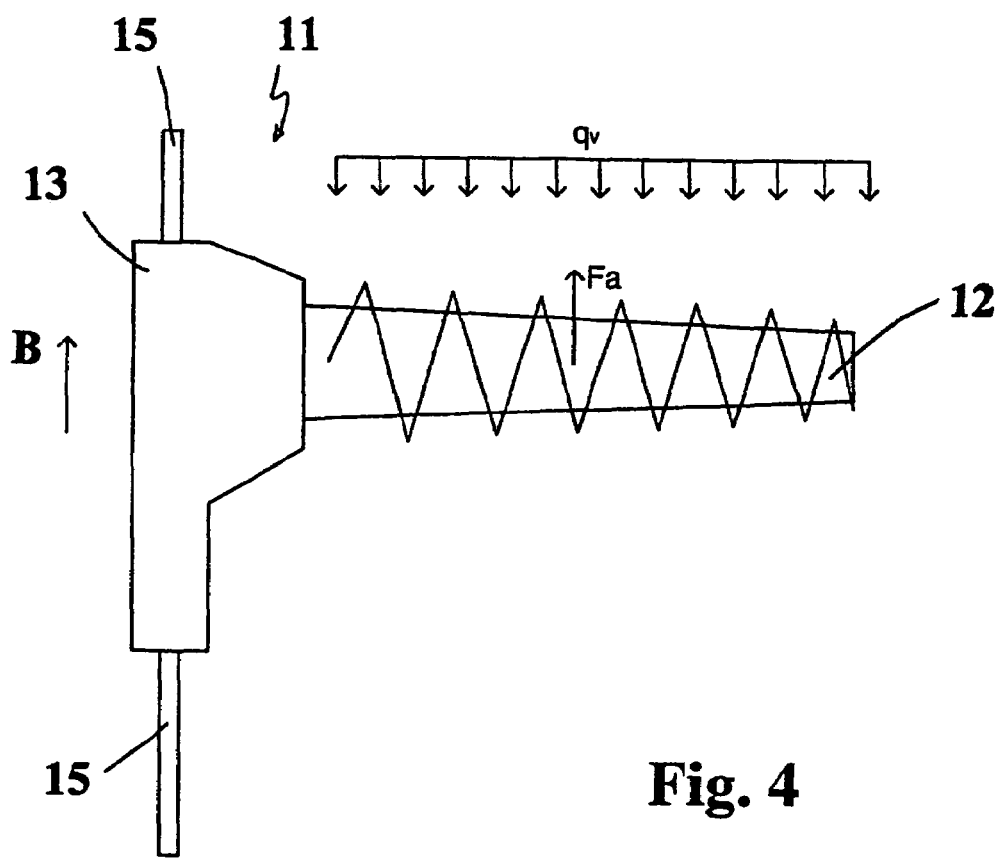
Figure 5:
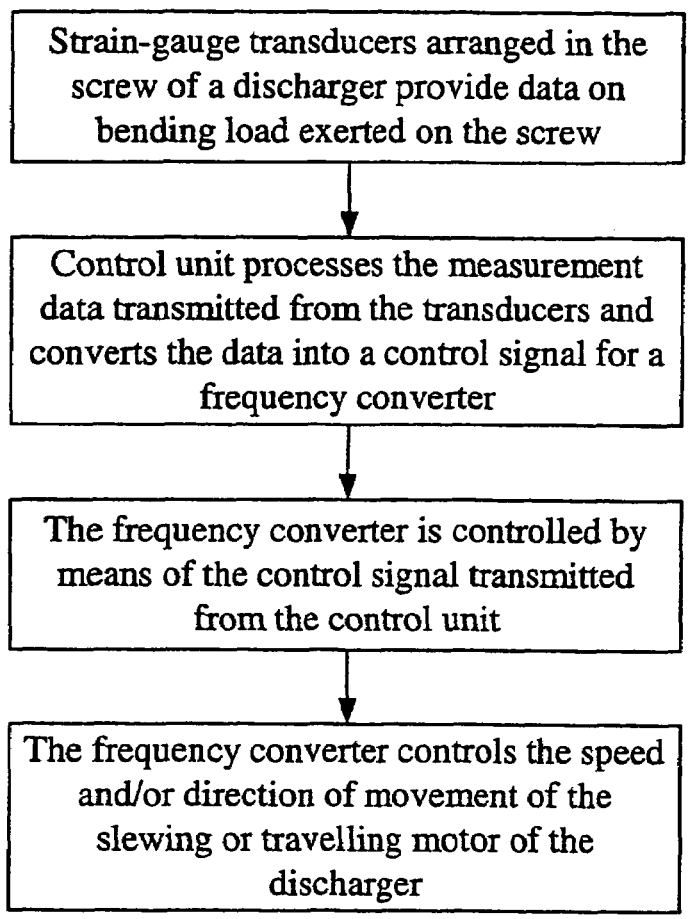
Figure 7:
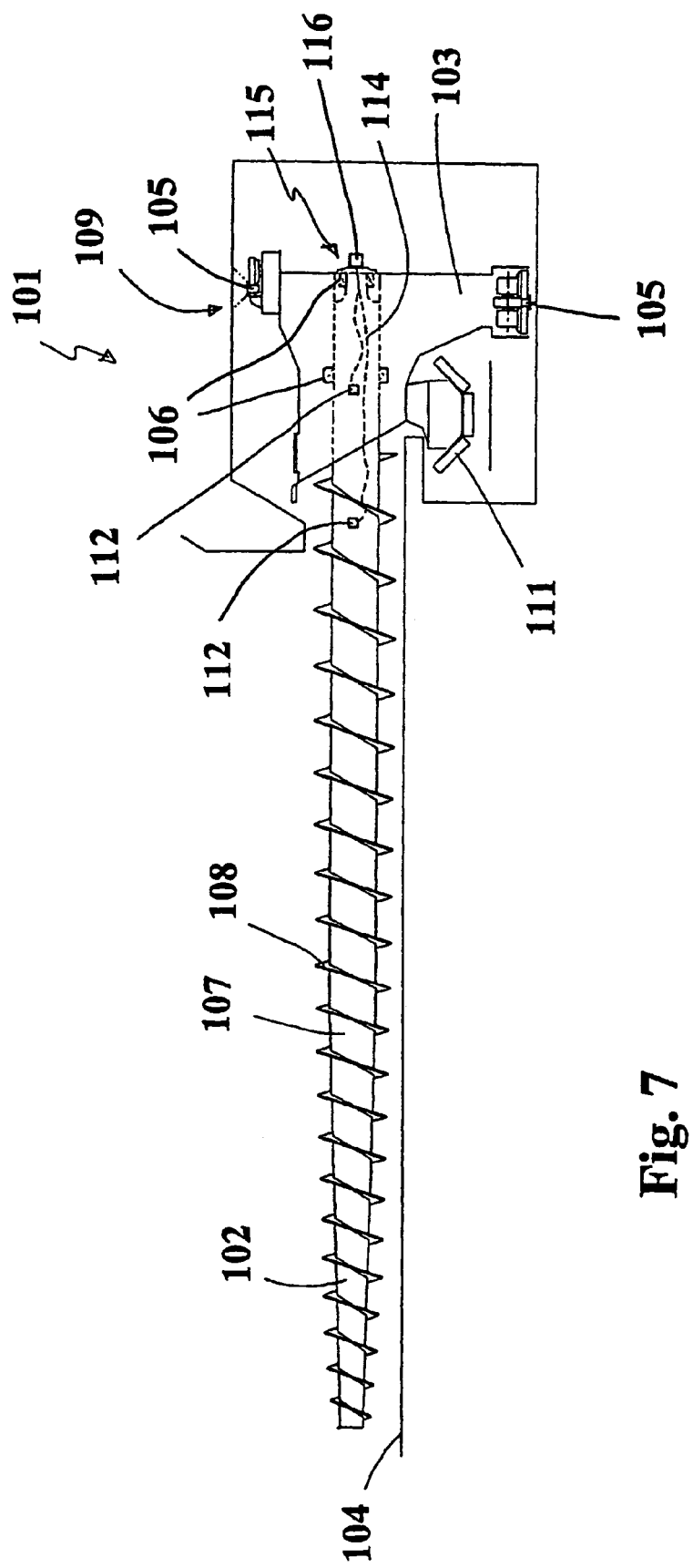
Figure 8:
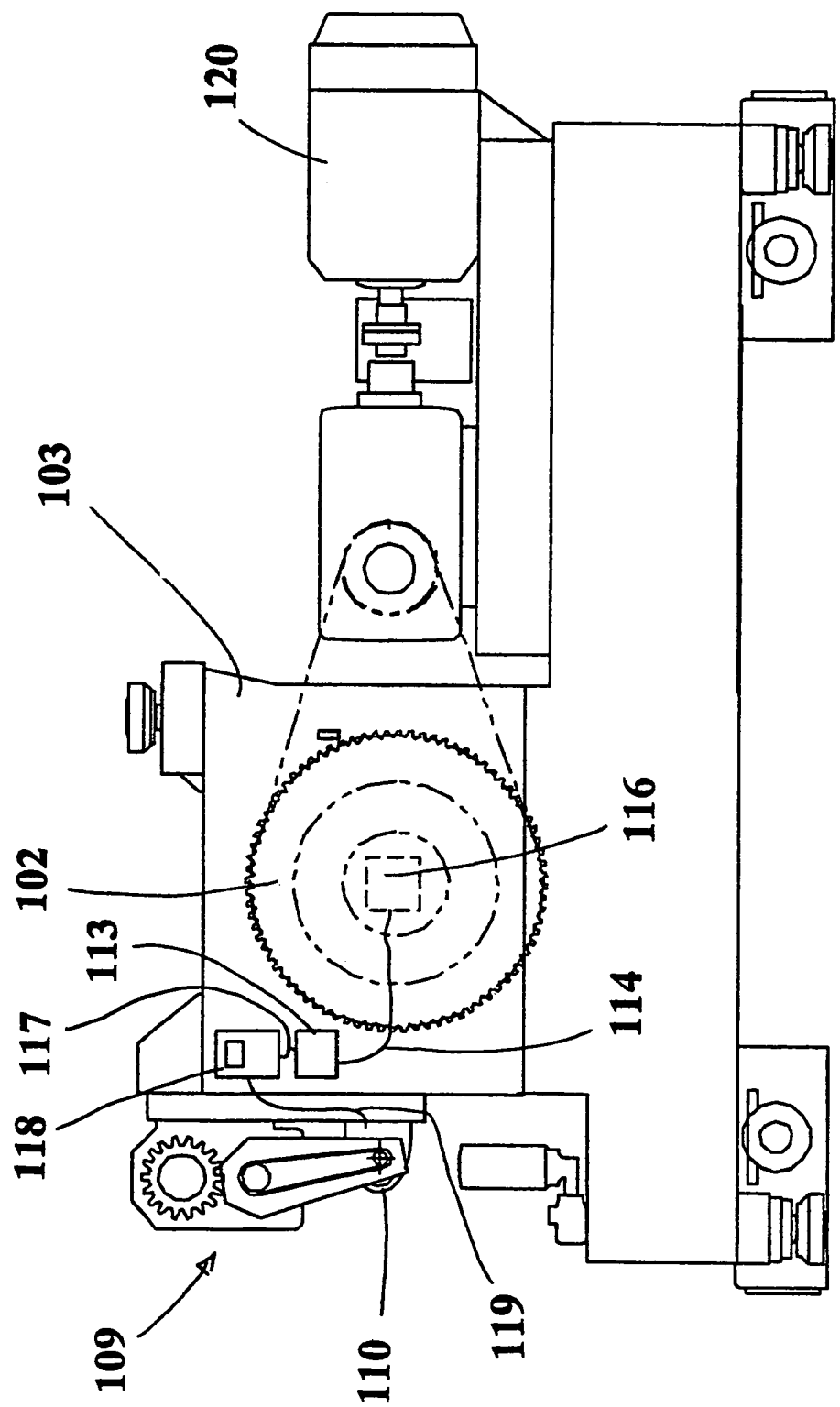
Figure 9:
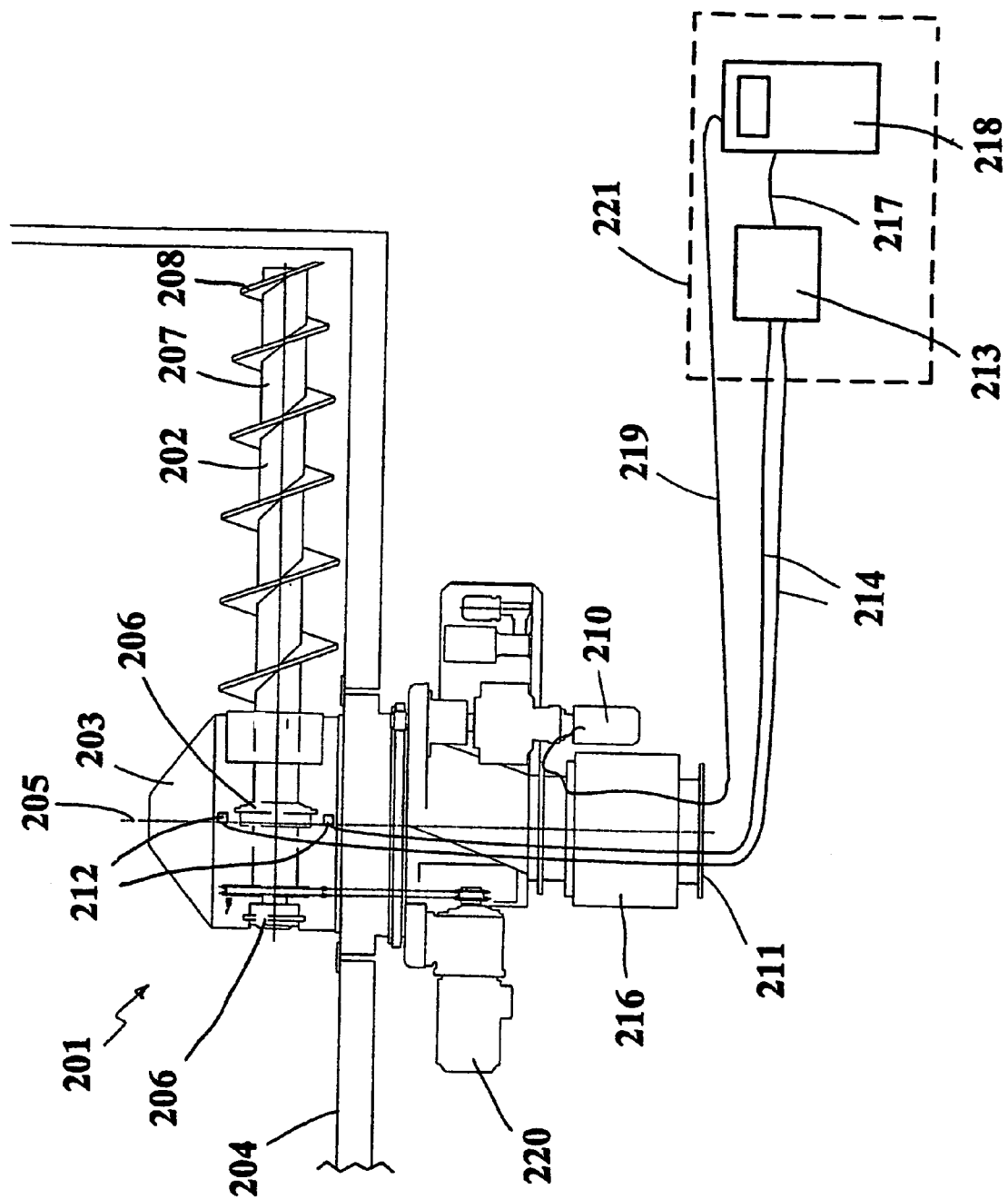

In the following, the invention is described in more detail by referring to the accompanying schematic drawings, in which FIG. 1 shows a schematic side view of the forces exerted on the screw of a rotating screw discharger according to the invention, FIG. 2 shows a top view of the discharger in FIG. 1, FIG. 3 shows a schematic side view of the forces exerted on the screw of a travelling screw discharger according to the invention, FIG. 4 shows a top view of the discharger in FIG. 3, FIG. 5 shows a method according to the invention as a flow chart, FIG. 6 shows schematically typical shapes of the torque-speed of rotation curves of a rotary magnet motor, FIG. 7 shows schematically an apparatus according to the invention in a travelling screw discharger viewed from the direction of the discharger's movement, FIG. 8 shows the discharger and apparatus in FIG. 7 viewed from the direction of the axle of the screw, FIG. 9 shows a schematic side view of an apparatus according to the invention in a slewing screw discharger.

FIGS. 1 and 2 show the following forces exerted on the screw 2 of a slewing discharger 1:

$q_{m1}$=vertical load generated by the pressure of the pile, $q_{m2}$=vertical load caused by the material packed under the screw 2, G=vertical load caused by the own weight of the screw 2, $q_v$=resistance to motion exerted by the pile/material on the screw 2, and $F_k$=slewing force of the screw 2 caused by the slewing torque $M_k$ of the discharger's frame.

Furthermore, horizontal and vertical supporting forces, which are not shown in the Figures, are exerted on the screw 2 at the points supported by bearings.

FIGS. 3 and 4 show the following forces exerted on the screw 12 of a travelling discharger 11:

$q_{m1}$=vertical load generated by the pressure of the pile,
$q_{m2}$=vertical load caused by material packed under the screw 12,
G=vertical load caused by the own weight of the screw 12,
$q_v$=resistance to motion exerted by the pile/material on the screw 12, and
$F_a$=travelling force of the screw 12.

Furthermore, horizontal and vertical supporting forces, which are not shown in the Figures, are exerted on the screw 12 at the points supported by bearings.

When slewing direction A or travelling direction B of the discharger 1 or 11 is switched to the opposite as compared with the directions depicted in FIGS. 2 and 4, the direction of the forces $q_v$ and $F_a$ also changes to the opposite direction.

The discharger 1 in FIGS. 1 and 2 has a frame 3, to which the screw 2 has been attached by means of bearings. The discharger 1 is situated on the floor 4 of a silo or similar storage. The discharger 1 is arranged to be rotatable about a vertical axis running approximately through the centre point of the frame 3 of the discharger.

The discharger 11 in FIGS. 3 and 4 has a frame 13 to which the screw 12 has been attached by means of bearings. The discharger 11 is arranged to be movable back and forth on rails 15 so as to keep the distance between the screw 12 and the floor 14 of a silo or similar storage approximately the same.

FIG. 6 shows typical shapes of the torque-speed of rotation curve of a rotary magnet motor according to the prior art. The symbol M in the Figure refers to the torque and the symbol n to the speed of rotation.

FIGS. 7 and 8 show an apparatus according to the invention in a travelling screw discharger 101. The discharger comprises a frame 103 and a screw 102 attached to the frame by means of bearings 106. A thread 108 winding spirally around the pipe is welded onto the screw pipe 107 of the screw. The frame 103 of the discharger is attached to horizontal rails 105 on which the discharger 101 is moved so as to keep the distance between the screw 102 and the floor 104 of a silo or similar storage constant. A drive system 109 is arranged against the rails 105 so as to move the discharger 101 along the rails. The drive motor 110 of the discharger, shown in FIG. 8, is arranged to drive the drive system 109. FIG. 7 also shows the conveyer 111 with which material unloaded by the discharger 101 is transferred out of the silo or similar storage.

Transducers 112 measuring the bending loads on the screw 102 are located on the outside surface of the screw pipe 107 and the measurement signal is transmitted to the control unit 113 located on the frame 103 of the discharger, via the wires 114 running inside the screw pipe 107 and via the slide ring unit 116 located at the tail end 115 of the screw pipe. From the control unit 113 the control signal is transmitted via wires 117 to the frequency converter 118 attached to the frame 103 of the discharger, which frequency converter is connected by means of wires 119 to a squirrel-cage induction motor 110 functioning as the drive motor of the discharger so as to control the speed and direction of rotation of the motor. FIG. 8 also shows the motor 120 driving the screw of the discharger.

FIG. 9 shows another apparatus according to the invention in a screw discharger 201 rotating about a vertical axis 205. A screw 202 is attached by means of bearings 206 to the frame 203 of the discharger, the screw comprising a screw pipe 207 and a thread 208. The material to be discharged is conveyed by the screw 202 into the frame 203 and through the floor 204 of a silo or similar storage and further through an opening 211. Transducers 212 measuring the bending load on the screw 202 are located on a vertical wall (not shown in the Figure) which is a part of the rotating frame 203 of the discharger, close to the bearing housing 206 of the screw. The measurement signal is transmitted from the transducers 212 via the wires 214 of the discharger and a slip ring power supply unit 216 to a control unit 213 located in a separate power room 221. From the control unit 213 the control signal is transmitted via wires 217 to a frequency converter 218, which also is located in the power room 221. The frequency converter 218 is connected by means of wires 219 to a squirrel-cage induction motor 210 functioning as the slewing motor of the discharger so as to control the speed and direction of rotation of the motor. The screw 202 is rotated by the motor 220 around its own horizontal axis.

FIG. 5 shows a method according to the invention as a flow chart. When applying the method in FIG. 5, for example, to the discharger 201 in FIG. 9, the method works as follows. When the discharger 201 is rotated around its vertical axis 205 by the power of its slewing motor 210, the bending loads shown in FIGS. 1 and 2 are exerted on the screw 202. The transducers 212 transmit a measurement signal that depends on the bending load to the control unit 213. Software installed in the memory circuit of the control unit interpret the measurement signal and, according to their software and depending on the measurement signal, transmit a control signal to the frequency converter 218. The frequency converter 218 controls the slewing motor 210.

The control unit 213 can also be programmed in such a way that when the bending load on the screw 202 increases to a preset value $x_1$, the speed of movement of the screw 202 is reduced, for example, by p %. If the bending load on the screw 202 increases even after this and reaches the value $x_2$ ($x_2 > x_1$), the direction of movement of the screw 202 is changed for a preset period of time. After this the direction of movement may be returned to the original setting. According to the requirements of the situation, the control unit may stop the screw discharger 201 altogether and transmit an error alarm, for example, to the control room. No examples are given for the above-mentioned figures $x_1$, $x_2$ and p, because the values vary considerably according the particular needs of a given situation. A person skilled in the art is capable of choosing appropriate values for any given situation when the idea of the invention presented here is explained to him/her.

It is not intended in any way to limit the scope of the invention only to the embodiments presented above in the description of the invention, but it may rather be modified within the scope of the inventive idea presented in the claims.

The invention claimed is:

1. A method for controlling at least one of speed and direction of movement of a screw discharger having a screw which is rotatable about a longitudinal axis and is moveable in a pile of bulk material, the method comprising the steps of:
    (a) measuring a bending load on the screw of the screw discharger with at least one transducer;
    (b) responsively generating a loading signal based on the bending load measured by the at least one transducer and directing the loading signal thereby generated to a drive system operatively connected to the screw discharger; and
    (c) controlling at least one of speed and direction of movement of the screw discharger in response to the drive system receiving the loading signal.

2. A method according to claim 1, wherein when the bending load on the screw as measured by the at least one transducer results in a loading signal having a value which falls below a preset value $y_1$, the speed of movement of the screw discharger is increased.

3. A method according to claim 1, wherein when the bending load on the screw as measured by the at least one transducer results in a loading value which exceeds a preset value $x_1$, at least one of the speed of movement of the screw is reduced and the direction of movement of the screw is changed.

4. A method according to claim 1, wherein when the bending load on the screw as measured by the at least one transducer results in a loading value which exceeds a preset value $x_1$, the speed of movement of the screw is reduced and if the bending load at this lesser speed of movement exceeds a preset value $x_2$, the value $x_2$ being equal to or greater than $x_1$, the direction of movement of the screw is then changed for a preset period of time.

5. A method according to claim 1, wherein the method comprises controlling a frequency converter on the basis of the bending load on the screw and wherein the frequency converter controls the drive system that controls at least one of the speed and direction of movement of the screw discharger.

6. An apparatus for controlling at least one of speed and direction of movement of a screw discharger having a frame, a discharger screw attached to the frame which is rotatable about a longitudinal axis and moveable in a pile of bulk material, and a drive system for driving the discharger screw, wherein the apparatus comprises:

at least one measurement transducer arranged to measure a bending load on the screw and to transmit measurement data based on the bending load thereby measured, a control unit for processing the measurement data transmitted from the at least one transducer and for converting the measurement data into a control signal for the drive system that controls at least one of speed and direction of movement of the screw discharger, and data transmission equipment for transmitting the measurement data from the at least one transducer to the control unit and for transmitting the control signal from the control unit to the drive system.

7. An apparatus according to claim 6, wherein the drive system comprises a frequency converter arranged for controlling at least one of the speed and direction of movement of the screw discharger generated by the drive system.

8. An apparatus according to claim 6, wherein the at least one measurement transducer for measuring the bending load on the screw is installed on the inside or outside surface of the screw pipe.

9. An apparatus according to claim 6, wherein the at least one measurement transducer for measuring the bending load on the screw is located in the frame of the screw discharger.

10. An apparatus according to claim 6, wherein the at least one measurement transducer includes a strain-gauge transducer.

* * * * *